United States Patent Office 3,492,021
Patented Jan. 27, 1970

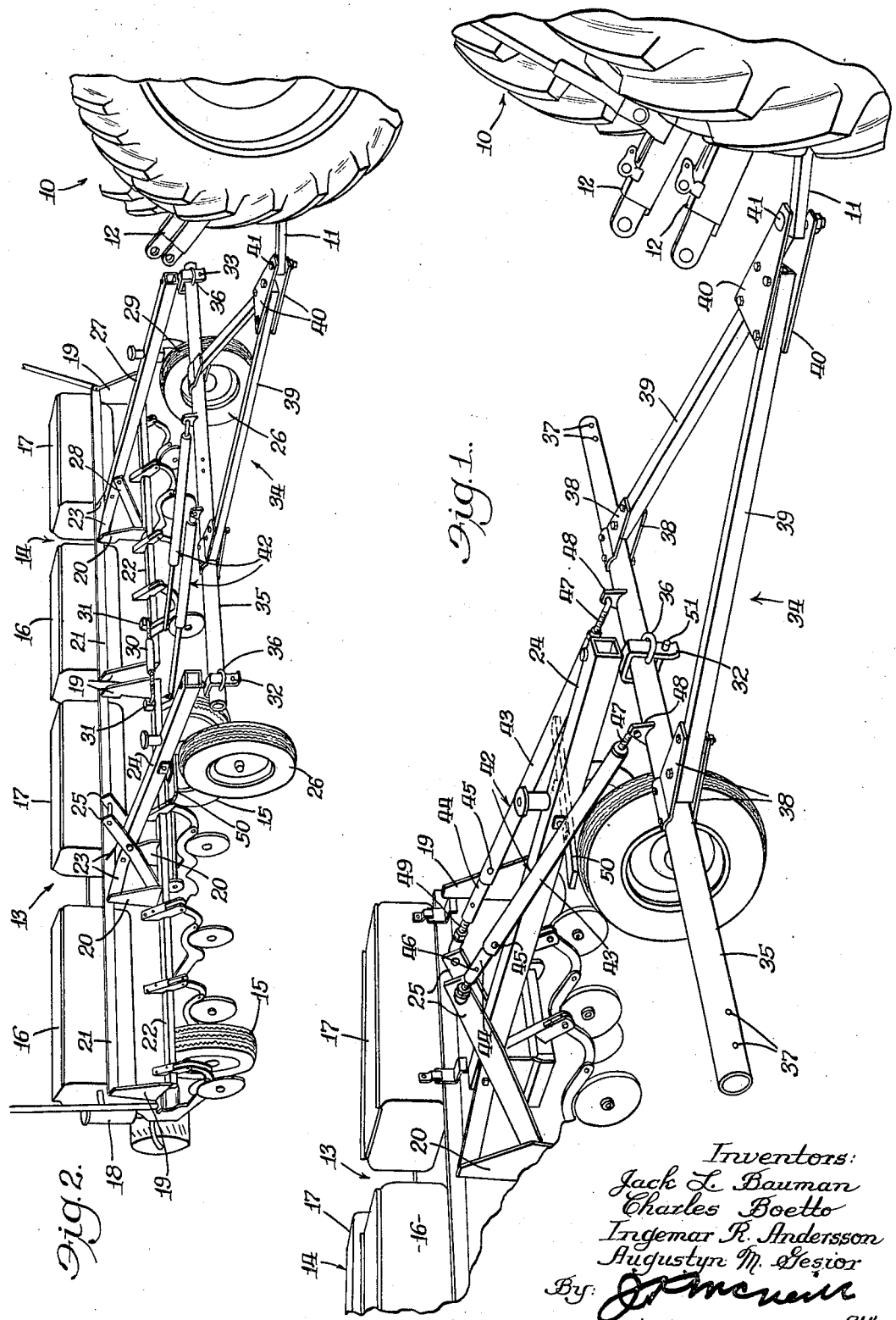

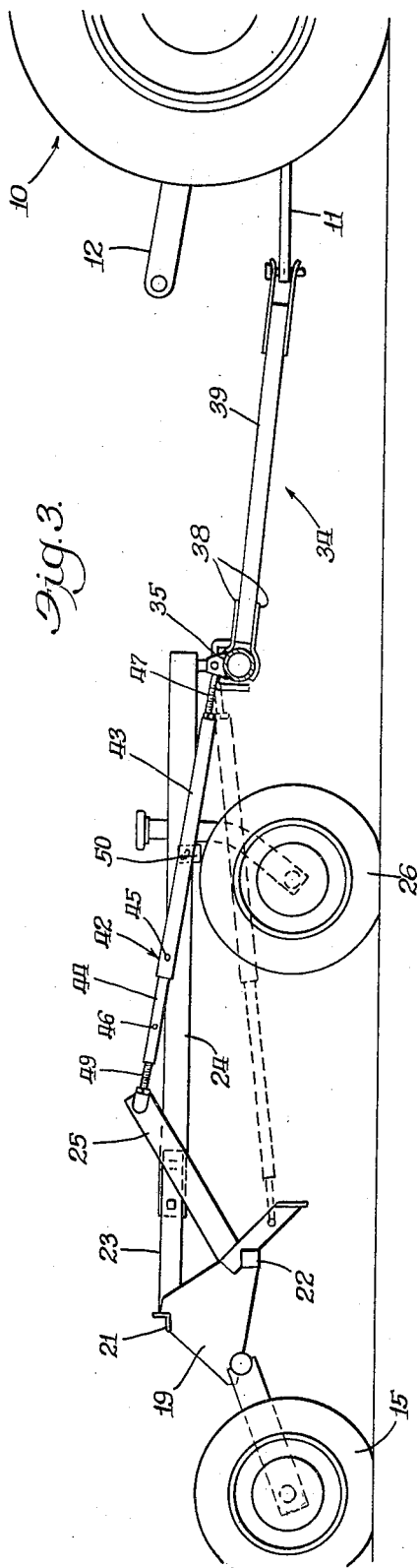
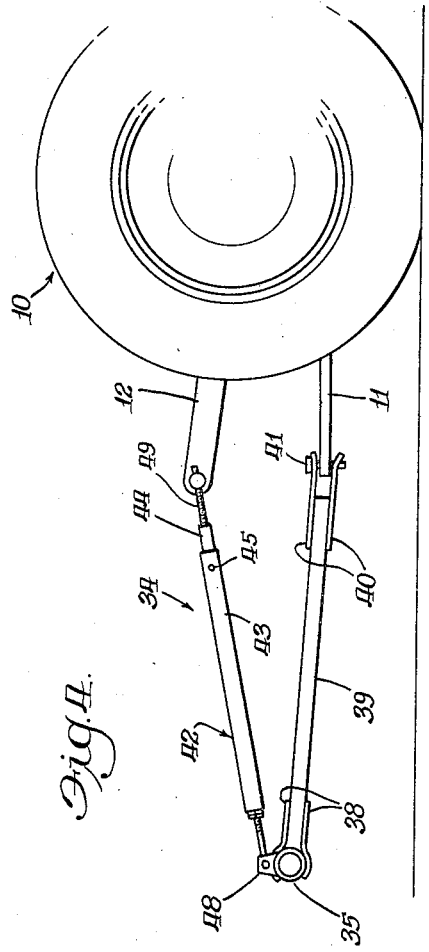

3,492,021
DUPLEX HITCH
Jack L. Bauman and Charles Boetto, Naperville, Ingemar R. Andersson, Hinsdale, and Augustyn M. Gesior, Clarendon Hills, Ill., assignors to International Harvester Company, Chicago, Ill., a corporation of Delaware
Filed May 16, 1968, Ser. No. 729,683
Int. Cl. B62d *13/00*
U.S. Cl. 280—411                                 9 Claims

ABSTRACT OF THE DISCLOSURE

A duplex hitch for a pair of transversely aligned implement units wherein a common hitch frame is connected at its ends to the draft tongues of both of the implement units in operation, and is connectable centrally to the draft tongue of only one of the implement units to allow the other unit to be connected to the rear of the first implement unit.

BACKGROUND OF THE INVENTION

This invention relates to agricultural implements and particularly to a duplex hitch for a pair of implements disposed end to end in transverse alignment during operation.

Due to the extreme width of an implement when two or more units are connected in side by side relationship to be attached by a common hitch to a tractor, the implement cannot, without modification, be transported through gates, over highways, etc. In order to facilitate transport, it is known to rearrange the units so that one is connected to the rear of the other in longitudinal alignment, thus cutting the width approximately in half. However, previously no satisfactory means has been found for converting the hitch structure and for controlling and stabilizing it both in operation and in transport. Therefore, the present invention has for its object the provision of a novel duplex hitch for multiple implement units and means for converting and controlling the hitch for operation and transport.

DESCRIPTION OF THE DRAWINGS

FIGURE 1 is a perspective view of the duplex hitch of this invention forming the connection between a tractor and the forwardmost of a pair of implement units arranged in tandem for transport purposes;

FIGURE 2 is a persepctive view of the duplex hitch structure of this invention connected to a pair of implement units in side by side relationship for operation;

FIGURE 3 is a diagrammatic side elevation, partly in section, of the hitch structure of this invention showing the connection to the tractor and to the implement; and FIGURE 4 is a view in side elevation of the duplex hitch structure disconnected from the implement but connected to the tractor to be transported thereby.

DESCRIPTION OF THE PREFERRED EMBODIMENT

In FIGURE 2 is shown a duplex implement in the form of a planter connected in draft receiving relation to a tractor 10 having a fixed, or relatively stationary drawbar 11 and a lifting hitch of the two-point type comprising laterally spaced links 12 adapted to be vertically moved between positions corresponding to the operating and transport positions of an implement.

The planter shown in FIGURE 2 comprises transversely aligned, laterally spaced planter units 13 and 14, each of which is supported upon laterally spaced wheels 15 and includes a pair of elongated fertilizer hoppers 16 and 17 and seed hoppers 18.

It may be understood that many of the structural details of the planter units 13 and 14 form no part of this invention. However, it may also be understood that the supporting frame for each of the units 13 and 14 includes generally triangularly shaped upright end plates 19 and a pair of centrally disposed plates 20 affixed to transverse members 21 and 22. On each of the planter units 13 and 14 a pair of straps 23 are secured to the upper ends of plates 20, and the forward ends of these straps on unit 13 are secured to a longitudinally extending tongue 24, square in cross section, braced by a pair of bars 25. The forward end of tongue 24 is supported by a castering wheel 26.

The forward ends of straps 23 on left-hand planter unit 14 are secured to the rear end of a horizontal forwardly extending draft tongue 27 to which are secured braces 28, the forward end of the tongue being supported on a castering wheel 29. The inner ends of units 13 and 14 are adjustably and releasably secured together in spaced relation by a turnbuckle 30, the ends of which are anchored to blocks 31 secured to the respective frame members 22 of the planters 13 and 14.

Downwardly opening flared socket members 32 and 33 are pivotally mounted on the forward ends of the respective draft tongues 24 and 27 for the attachment of the planter assemblies 13 and 14 to a hitch assembly 34, generally triangularly shaped, comprising a rear transversely extending tubular member 35, the ends of which, in the operating position of the implement, shown in FIGURE 2, are received in socket members 32 and 33 and secured therein by U-bolts 36 received in openings 37 in the ends of tubular member 35. Laterally spaced pairs of plates 38 are mounted on member 35 and are secured to the rear ends of forwardly converging hitch bars 39, the forward ends of which are secured between vertically spaced plates 40, the forward ends of which carry a hitch pin 41 for connection of the hitch frame 34 to the relatively stationary tractor drawbar 11.

In the operating position of the implement in FIGURE 2, a pair of control links 42 are illustrated in their carry position. Each of the control links or rods 42 comprises telescoping cylindrical members 43 and 44 adjustably connected by a pin 45 receivable in aligned openings in members 43 and 44 and optionally receivable in additional openings 46 in members 44 to adjust the effective length of the links 42. Each member 43 is threaded to receive the threaded shank of a hook bolt 47 pivotally connected to lugs 48 affixed to transverse hitch member 35 at spaced locations centrally thereof. Members 44 are threaded to adjustably receive the threaded shanks of hook bolts 49 which, in FIGURE 2, are shown resting upon portions of the implement frames.

As pointed out before, the extreme width of the operating implement as shown in FIGURE 2 renders transporting of the implement over highways and through gates and the like impractical. In order to facilitate transportation of the implement left-hand planter assembly 14 is disconnected from hitch assembly 34 by removing U-bolt 36 and turnbuckle 30. Unit 14 is then arranged in tandem relation rearwardly of planter unit 13 and draft bar 27 of unit 14 is connected in any well known manner, not shown, to the rear of unit 13 to trail therebehind. Draft tongue 24 of unit 13 is released from the hitch frame 34 by removing U-bolt 36. The associated socket member 32 is then connected to the transverse member 35 centrally thereof between lugs 48, as shown in FIGURE 1.

The rear ends of control links 42, released from the respective planter units 13 and 14, are connected to the upper ends of brace bars 25, suitable adjustment being made, if necessary, in the length of the control links by telescoping members 43 and 44, or by adjusting bolts 47 and 49. Relative movement between hitch frame 34 and draft bar 24 about the pivotal connection of socket member 32 to draft bar 24 is thus prevented.

The relationship between hitch frame 34 and the implement is further stabilized by the provision of a cross bar member 50 affixed to draft bar 24 and engageable with control links 42 in the transport position of FIGURE 1 to prevent angular movement of hitch frame 34 relative to the draft bar 24.

When the implement and tractor are to be separated, either from the position of FIGURE 1 or that of FIGURE 2, the rear ends of control links 42 are released and swung forwardly for connection to the tractor hitch members 12, as indicated in FIGURE 4. As pointed out before, hitch members 12 can be raised and lowered by conventional tractor lift mechanism and they can be held in a selected position by means well known in the art. Thus, hitch frame 34 can be transported on the tractor and can be vertically moved to any desired position and transported after the socket members 32 and 33 have been released from transverse member 35.

Use of the power lift mechanism of the tractor through hitch members 12 to support hitch frame 34 facilitates attachment and detachament of the implement to and from the hitch frame. A pin 51 extending between the lower ends of socket members 32 prevents vertical displacement of draft bars 24 and 27 from the transverse member 35, and with the control links 42 in the position of FIGURE 4, after removal of U-bolts 36 and pin 51, hitch frame 34 can be lowered away from sockets 32 in either the FIGURE 1 or FIGURE 2 position of the implement and reattachment can be made by raising the hitch frame 34 until the transverse member 35 is received in the sockets.

It is believed that the construction and operation of the novel duplex hitch structure of this invention will be clearly understood from the foregoing description. It should likewise be understood that the invention has been described in its preferred embodiment and that modifications may be made therein without departing from the spirit of the invention.

What is claimed is:

1. In a duplex implement adapted for connection in trailing relation to a tractor having a relatively stationary hitch point and vertically swingable lift means, wherein the implement includes laterally spaced units each having supporting wheels and a central rigid forwardly projecting draft tongue, a hitch frame pivotally connected to the tractor at said hitch point and including a transverse member having its ends releasably connected to the forward ends of said draft tongues in the operating position of the implement, said transverse member being optionally connectable at its center to the end of the draft tongue of one of said units to accommodate shifting the other of said units to a transport position in tandem behind said one of said units, and a pair of control links pivotally connectable to said one of said units in said transport position and extending forwardly therefrom, the forward ends of said control links being pivotally connected at laterally spaced locations to said transverse member on opposite sides of the connection thereto of the draft tongue of said one of said units to stabilize said hitch frame relative to a vertical axis.

2. The invention set forth in claim 1, wherein said control links are releasable from their connections to said one of said units and are swingable forwardly about their pivots on said transverse member, upon release of said draft tongue from said transverse member, for optional connection to said tractor lift means to accommodate vertically moving said hitch frame in response to vertically swinging said lift means.

3. The invention set forth in claim 1, wherein a stabilizer member is mounted on the draft tongue of said one of said units and is engageable with said control links in the transport position of the implement to prevent angular movement of said transverse hitch member in a vertical plane relative to the draft tongue of said one of said units.

4. In a duplex implement adapted for connection in trailing relation to a tractor having a relatively stationary hitch point and vertically swingable lift means, wherein the implement includes laterally spaced units each having supporting wheels and a central rigid forwardly projecting draft tongue, a generally triangularly shaped hitch frame pivotally connetced to the tractor at said hitch point and including a transverse member having its ends releasably connected to the forward ends of said draft tongues in the operating position of the implement, said transverse member being optionally connectable at its center to the end of the draft tongue of one of said units to accommodate shifting the other said unit to a transport position in tandem behind said one of said units, and a pair of control links pivotally connected to said transverse member on opposite sides of the center thereof and connectable at their other ends to said tractor lift means, upon release of said transverse member from said draft tongues, to accommodate vertically moving said hitch frame in response to vertical swinging of said lift means.

5. The invention set forth in claim 4, wherein said other ends of said control links are optionally connectable to said one of said units in the transport position of the implement to maintain said transverse member normal to the draft tongue of said one of said units.

6. The invention set forth in claim 5, wherein said control links are adjustable in length.

7. The invention set forth in claim 5, wherein a crossbar is secured to the draft tongue of said one of said units and is engageable with said control links in said transport position of the implement to stabilize said hitch frame vertically.

8. The invention set forth in claim 5, wherein the forward ends of said draft tongues are provided with downwardly opening sockets adapted to slidably receive and seat the ends of said transverse member in response to raising said hitch frame when said control links are connected thereto.

9. The invention set forth in claim 8, wherein means are provided for releasably locking said transverse member in said sockets.

References Cited

UNITED STATES PATENTS

| | | | |
|---|---|---|---|
| 1,876,723 | 9/1932 | Minton | 280—411 |
| 2,319,751 | 5/1943 | Silver | 280—411 |
| 2,925,201 | 2/1960 | Peoples. | |
| 2,955,848 | 10/1960 | Hyland et al. | 280—411 |
| 3,269,749 | 8/1966 | Hartwig | 280—411 |

LEO FRAGLIA, Primary Examiner

U.S. Cl. X.R.

172—248